Feb. 8, 1955 L. L. BURNS, JR 2,701,469
VISCOMETER
Filed May 29, 1953
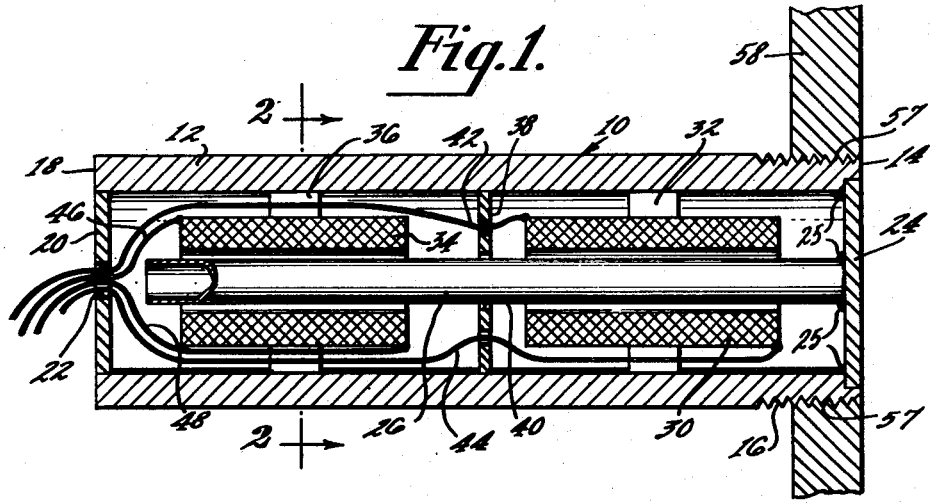
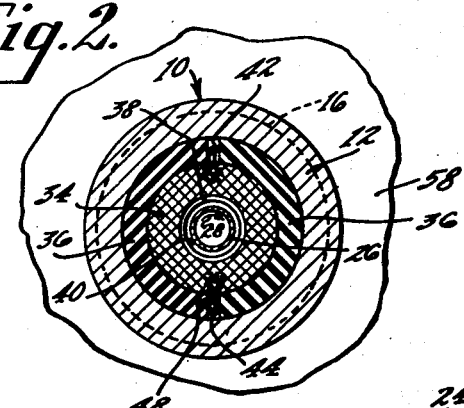
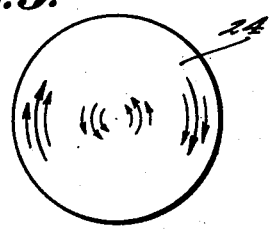
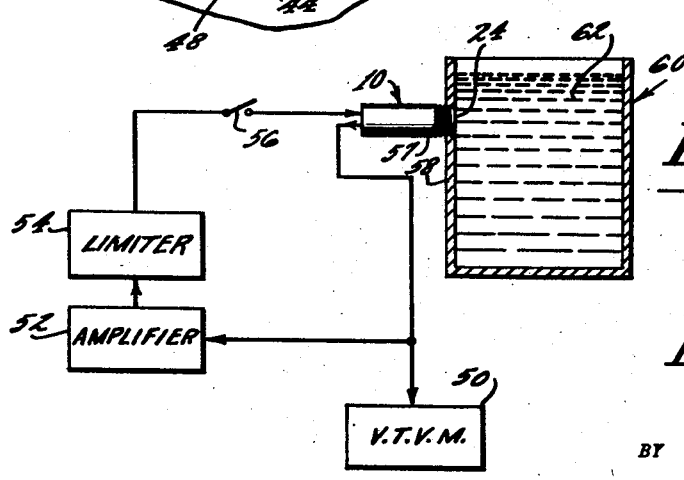
INVENTOR.
Leslie L. Burns, Jr.
BY
ATTORNEY United States Patent Office
2,701,469
Patented Feb. 8, 1955

2,701,469

VISCOMETER

Leslie L. Burns, Jr., Princeton, N. J., assignor to Radio Corporation of America, a corporation of Delaware Application May 29, 1953, Serial No. 358,451

6 Claims. (Cl. 73—59)

This invention relates generally to viscometers, and more particularly to a highly improved viscometer of the type wherein a disc is adapted to oscillate in concentric shear at an ultrasonic frequency. While neither specifically nor exclusively limited thereto, the viscometer of the present invention is particularly useful in combination with a tank, as a part thereof, for the purpose of continuously recording the viscosity of any liquid within the tank.

It has been found desirable to note continuously the viscosity of a liquid product during its process of manufacture. For instance, in the mixing and blending of oils of different viscosities, for the purpose of obtaining a resultant oil of a predetermined viscosity, it is necessary to mix oils of different viscosities in proportions which will result in a mixture having the desired viscosity. This process is greatly simplified if viscosity readings may be had continuously during the mixing and/or blending of the liquids. Since the tanks in which these oils are mixed have large mechanical stirrers inserted therein, most of the viscometers of the prior art are not suitable for immersion within the tank during the mixing and/or blending process. In most of the methods of the prior art, a sample of the liquid whose viscosity is to be measured is withdrawn, at frequent intervals, from the tank and tested separately.

In most prior art viscometers of the type wherein a vibrating element is immersed into a liquid whose viscosity is to be measured, the cleaning of this vibrating element and its associated parts is a relatively delicate operation. The vibrating element is often associated with delicate coils and springs which require special handling. Also, the operator of most prior art viscometers must exercise great care in immersing the vibrating element into the test liquid to a predetermined depth in order to get an accurate reading, and also to prevent damage to the associated parts of the viscometers.

It is a principal object of the present invention to provide a highly improved viscometer for measuring the viscosity of liquids over a wide range and which overcomes the aforementioned and other difficulties of the prior art.

It is a further object of the present invention to provide an improved viscometer of the type adapted to be combined with a tank, as a part thereof, for the purpose of measuring continuously the viscosity of the fluid within the tank.

It is still a further object of the present invention to provide an improved viscometer adapted to measure the viscosity of a liquid within a tank without interfering with scrapers or stirrers protruding into the tank.

Another object of the present invention is to provide, in a viscometer of the type described, a novel probe which is completely sealed whereby no motion is transmitted through any seal.

A further object of the present invention is to provide a highly improved viscometer which is rugged in construction, simple in operation, economical to manufacture, and highly efficient in use.

These and further objects of the present invention are attained in a viscometer comprising a probe of novel construction and operation. This probe comprises a magnetostrictive rod or tube driven in torsion by an input coil. The magnetostrictive tube is permanently, circularly magnetized so as to produce a magnetic field which will react with the magnetic field of the input coil to produce a resultant field whereby to drive the tube in torsion. One end of the tube is fixed to the center of a circular disc. The periphery of the circular disc is fixed to one end of a hollow casing, coaxially aligned with the magnetostrictive tube. When it is desired to obtain the viscosity of a liquid, the disc is placed in contact with the liquid and the torsion oscillations of the magentostrictive tube will drive the disc in concentric shear. The viscosity of the liquid will determine the mechanical Q of this system. The amplitude of oscillations of the system will be proportional to this Q, and will also be a function of the viscosity of the liquid being measured. The amplitude of oscillations is measured by an output coil which feeds the energy it picks up from the oscillating tube to a meter, then to an amplifier and limiter, and then back to the input coil to keep the system oscillating. Thus, the viscosity of the liquid determines the reading of the meter, which can be calibrated in centipoise, or any other suitable units. The entire probe may be combined with a tank so that the disc of the probe forms a portion of the wall of the tank. In this manner, continuous viscosity readings may be had of the liquid within the tank during a manufacturing process, while the liquid is undergoing a chemical or physical change, without interfering with the manufacturing process.

The novel features of the present invention, as well as the invention itself, both as to its organization and method of operation, will be understood in detail from the following description when considered in connection with the accompanying drawing, in which similar reference numerals refer to similar elements, and in which:

Fig. 1 is a central sectional view of one form of viscometer probe in accordance with the present invention, with some portions shown in full and with parts cut away, Fig. 2 is a cross-sectional view of the probe, taken along the line 2—2 of Fig. 1, Fig. 3 is a front elevational view of a disc illustrating a possible mode of vibration in concentric shear at one instant of time according to the present invention, and Fig. 4 is a side elevational view of the combination of the viscometer with a tank, partly in cross-section, and partly in block diagram form.

Referring, now, specifically to Figs. 1 and 2, there is shown a probe 10 of a viscometer constructed in accordance with the present invention. The probe 10 comprises an elongated, cylindrical, hollow casing 12 which may be made of brass, stainless steel, or any other suitable material. The outer surface of the casing 12, adjacent one end 14 thereof, may be formed with screw threads 16 for the purpose hereinafter appearing. The other end 18 of the casing 12 may be sealed in any suitable manner, as by a circular plug 20 formed with a relatively small opening 22 in the center thereof.

The periphery of a circular disc 24 is sealed to the end 14 of the casing 12, in any suitable manner, so as to provide an air-tight and liquid-tight seal. The disc 24 may be preferably of a non-corrosive material. Metals which have an elastic coefficient that is constant with temperature have been found satisfactory for the disc 24. A cylindrical rod or tube 26, having a diameter smaller than the diameter of the casing 12, is coaxially aligned with the casing 12 and has one end fixed to the center of the disc 12, as by welding 25, or by any other suitable means. The tube 26 is wholly within the casing 12. The tube 26 is made of magnetostrictive material and is permanently, circularly magnetized, whereby the direction of its magnetic field is substantially perpendicular to the longitudinal axis of the tube 26, as shown by the arrow 28 in the center of Fig. 2. The required circular magnetization of the tube 26 may also be accomplished by a current carrying coil (not shown) threaded about the tube, in a manner well known in the art. An output coil 30, of hollow cylindrical form, is positioned around the tube 26, coaxially aligned therewith, and out of physical contact therewith. The coil 30 may be positioned coaxially within the casing 12 by means of a pair of opposed, substantially semi-circular or other suitable spacers 32.

A hollow, cylindrically-shaped input coil 34 is also positioned within the casing 12, adjacent the plug 20. The coil 34 is coaxially aligned with the casing 12 and the tube 26, and may be fixed to the casing 12, as by spacers 36 similar to the spacers 32. The coil 34 is also out of physical contact with the rod 26.

The output coil 30 and the input coil 34 are separated from each other by a circular, magnetic shield 38 fixed within the casing 12 by any suitable means. The shield 38 is formed with a central opening 40 through which the rod 26 passes without touching. Wires 42 and 44, connected to the respective ends of the output coil 30, pass through laterally-spaced openings in the shield 38, and through the opening 22 in the plug 20. Wires 46 and 48, connected to respective ends of the input coil 34 also pass through the opening 22 in the plug 20. If desired, the opening 22 may be filled with a suitable compound (not shown) to make the interior of the casing 12 air-tight and liquid-tight.

Referring, now, to Fig. 4, there is shown, in block diagram form, the electrical circuit of the viscometer, in accordance with the present invention. The output coil 30 is connected to a vacuum tube voltmeter 50, and also to an amplifier 52. The vacuum tube voltmeter 50 and the amplifier 52 may be of conventional types, well known in the art. The output of the amplifier 52 is fed to a conventional limiter 54, and thence to the input coil 34 through a switch 56.

The probe 10 may be screwed into a threaded opening 57 in a wall 58 of a tank 60, as shown in Figs. 1 and 4. When so inserted, the disc 24 forms a part of the wall 58 of the tank 60. A liquid 62, which may be undergoing some manufacturing or chemical process within the tank 60, thus comes in contact with the disc 24 of the probe 10.

The operation of the viscometer, in accordance with the present invention, will now be explained. Let it be assumed that it is desired to determine the viscosity of the liquid 62 within the tank 60. When the switch 56 is closed, current will begin to flow through the input coil 34, as a result of the closed circuit including the amplifier 52 and limiter 54, and their associated power supplies (not shown), in a manner well known in the art. Current through the coil 34 will set up a magnetic field within the axial, through opening of the coil 34, in a direction parallel to the longitudinal axis of the tube 26. This magnetic field will react with the permanent, circular, magnetic field about the tube 26 to produce a resultant field which will drive the magnetostrictive tube 26 in torsion. Since the tube 26 is fixed to the disc 24, the latter will be driven in concentric shear. The mode of concentric shear vibration at any one instant of time may be in the directions shown by the arrows on the face of the disc 24 in Fig. 3. While Fig. 3 shows the disc 24 oscillating in accordance with the second harmonic of its fundamental frequency, it is to be understood that the disc 24 may oscillate in concentric shear at harmonics of higher order, as well as at its fundamental frequency.

The oscillations of the magnetostrictive tube 26 will induce a voltage across the output coil 30 which, in turn, is connected to the vacuum tube voltmeter 50. Since the amplitude of oscillations of the magnetostrictive tube 26 is a function of the damping of the disc 24 by the liquid 62 in contact therewith, the reading of the vacuum tube voltmeter 50 is proportional to the viscosity of the liquid 62. A portion of the current flowing in the coil 30 is input coil 34 in order to keep the magnetostrictive tube imput coil 34 in order to keep the magnetostrictive tube 26 oscillating. The function of the limiter 54 is to drive the input coil 34 with energy of a constant amplitude. Thus, in all cases, the energy picked up by the output coil 30 is a function of the damping effect of the liquid in contact with the disc 24. In this manner, the indicator (not shown) on the vacuum tube voltmeter 50 is proportional to the damping effect of the liquid on the disc 24, and, hence, is proportional to the viscosity of the liquid.

The probe 10 may be made as an air-tight and liquid-tight component. Thus, it may be held in the hand and inserted into any liquid whose viscosity it is desired to measure. If large stirrers, scrapers, or other pieces of equipment are to be immersed in a tank, and it is desired to take a continuous viscosity reading of the liquid in the tank, the probe 10 may be fixed in the wall of the tank so that the disc 24 forms a continuous portion of the wall of the tank, as explained above. In this manner, the liquid 62 may be processed, as by a manufacturing process, and the viscosity of the liquid 62 may be determined continuously. For instance, if the liquid 62 is to be diluted by another liquid until its viscosity is a predetermined amount, the liquid of lesser viscosity may be added to the liquid of greater viscosity and vigorously mixed while the vacuum tube voltmeter is watched. When the mixture is diluted to the proper viscosity, as indicated by the vacuum voltmeter 50, the process is stopped. It is obvious that the probe 10 lends itself easily to the combination with a tank, whereby continuous viscosity readings may be made. This is a great improvement, from the standpoint of savings in time and labor, over apparatus and methods which require that a sample be taken from the tank at frequent intervals during a manufacturing process.

Thus, there has been shown and described, in accordance with the objects of the present invention, a viscometer comprising a probe of novel construction and operation. The probe comprises a circular disc, sealed at its periphery to the end of a tubular casing, and driven in concentric shear by a magnetostrictive tube. The probe may be made as an air-tight and liquid-tight component, and of materials that are non-corrosive and easily cleanable. Since no motion is transmitted through any of the seals of the probe, the probe may be immersed into any liquid whose viscosity it is desired to measure, or it may be combined with a tank, so that the disc of the probe becomes a part of the wall of the tank, whereby continuous viscosity readings may be taken.

The frequency of oscillation of the magnetostrictive rod will be a function of its length, and the frequency of oscillation of the disc will be a function of its diameter. The dimensions of the rod and the disc to which it is attached should be such that they have substantially the same freqeuncy of oscillation, thereby providing for a maximum transfer of energy. At a frequency of 100 kc. per second of oscillation, a disc of about 3" in diameter has been found satisfactory.

What is claimed is:

1. A viscometer, for determining the viscosity of a liquid, comprising a probe having a hollow, cylindrical casing, a disc the periphery of which is sealed to one end of said casing, a circularly magnetized magnetostrictive tube, of smaller diameter than said casing, coaxially aligned within said casing, one end of said tube being fixed to the center of one surface of said disc, the other surface of said disc being adapted to contact said liquid when determining the viscosity thereof, an input coil and an output coil each coaxially aligned with said tube adjacent opposite ends thereof and out of contact therewith, driving means including said input coil to drive said tube in torsion oscillation whereby to drive said disc in concentric shear, and indicating means coupled to said output coil to record the energy induced therein by said tube.

2. A viscometer, for determining the viscosity of a liquid, comprising a probe having a hollow, cylindrical casing, a disc the periphery of which is sealed to one end of said casing, a circularly magnetized magnetostrictive tube, of smaller diameter than said casing, coaxially aligned within said casing, one end of said tube being fixed to the center of one surface of said disc, the other surface of said disc being adapted to come in contact with said liquid when determining the viscosity thereof, an input coil and an output coil each coaxially aligned with said tube adjacent opposite ends thereof and out of contact therewith, driving means including said input coil to drive said tube in torsion oscillation whereby to drive said disc in concentric shear, and indicating means coupled to said output coil to record the energy induced therein by said tube, said driving means including feed back means coupled between said output and input coils to feed back a portion of the energy from said output coil to said input coil.

3. A viscometer, for determining the viscosity of a liquid, comprising a probe having a hollow, cylindrical casing, a disc the periphery of which is sealed to one end of said casing, a circularly magnetized magnetostrictive tube, of smaller diameter than said casing, coaxially aligned within said casing, one end of said tube being fixed to the center of one surface of said disc, the other surface of said disc being adapted to come in contact with said liquid when determining the viscosity thereof, an input coil and an output coil each coaxially aligned with said tube adjacent opposite ends thereof and out of contact therewith, driving means including said input coil to drive said tube in torsion oscillation whereby to drive said disc in concentric shear, and indicating means coupled to said output coil to record the energy induced therein by said tube, said driving means including feed back means coupled between said output and input coils to feed back a portion of the energy from said output coil to said input coil, said feed back means comprising means to amplify and to limit the energy fed back from said output coil to said input coil, whereby said input coil is driven with energy of a constant amplitude.

4. A viscometer, for determining the viscosity of a liquid, comprising a probe having a hollow, cylindrical casing, a disc the periphery of which is sealed to one end of said casing, a circularly magnetized magnetostrictive tube, of smaller diameter than said casing, coaxially aligned within said casing, one end of said tube being fixed to the center of one surface of said disc, the other surface of said disc being adapted to come in contact with said liquid when determining the viscosity thereof, an input coil and an output coil each coaxially aligned with said tube adjacent opposite ends thereof and out of contact therewith, driving means including said input coil to drive said tube in torsion oscillation whereby to drive said disc in concentric shear, indicating means coupled to said output coil to record the energy induced therein by said tube, and shielding means positioned between said input and output coils to prevent induction therebetween.

5. A viscometer, for determining the viscosity of a liquid, comprising a probe having a hollow, cylindrical casing, a disc the periphery of which is sealed to one end of said casing, a circularly magnetized magnetostrictive tube, of smaller diameter than said casing, coaxially aligned within said casing, one end of said tube being fixed to the center of one surface of said disc, the other surface of said disc being adapted to come in contact with said liquid when determining the viscosity thereof, an input coil and an output coil each coaxially aligned with said tube adjacent opposite ends thereof and out of contact therewith, driving means including said input coil to drive said tube in torsion oscillation whereby to drive said disc in concentric shear, indicating means coupled to said output coil to record the energy induced therein by said tube, and means to seal the other end of said casing whereby said probe is made liquid-tight and air-tight.

6. Apparatus for determining the viscosity of a liquid in a tank, said tank having a wall formed with an opening therein, said apparatus comprising, in combination, a tubular casing, a disc sealed to one end of said casing, a circularly magnetized, magnetostrictive rod coaxially aligned within said casing and having one end fixed to the center of said disc, means to drive said rod in torsion oscillation whereby to drive said disc in concentric shear, means inductively coupled to said rod to derive energy therefrom when oscillating, and means to measure the energy in said inductively coupled means, said casing being positioned within said opening and fixed to said wall, and said disc forming a portion of said wall of said tank for retaining liquid therein.

References Cited in the file of this patent

UNITED STATES PATENTS

| | | |
|---|---|---|
| 1,750,124 | Pierce | Mar. 11, 1930 |
| 2,340,992 | Siegel | Feb. 8, 1944 |
| 2,518,348 | Mason | Aug. 8, 1950 |
| 2,550,052 | Fay | Apr. 24, 1951 |
| 2,633,016 | Millington | Mar. 31, 1953 |